United States Patent [19]
Doerschlag

[11] 3,731,463
[45] May 8, 1973

[54] STRIP CYCLONE

[75] Inventor: Christian Doerschlag, Columbus, Ohio

[73] Assignee: American Van Tongeren Corporation, Columbus, Ohio

[22] Filed: Sept. 20, 1971

[21] Appl. No.: 181,804

[52] U.S. Cl. ...................55/238, 55/257, 55/349, 55/440, 55/459, 55/DIG. 25, 261/79 A
[51] Int. Cl. .............................................B01d 47/06
[58] Field of Search..................55/342, 343, 344, 55/345, 346, 347, 348, 349, 238, 237, 236, 235, 257, 440, 459, DIG. 25, 460, 239; 210/512; 261/79 A, 79 R, 108, 111, 112, 113, 115, 116, 117, 118

[56] References Cited

UNITED STATES PATENTS

| | | | |
|---|---|---|---|
| 1,999,589 | 4/1935 | Frey | 55/238 |
| 2,351,864 | 6/1944 | Linderman, Jr. | 261/79 A |

FOREIGN PATENTS OR APPLICATIONS

| | | | |
|---|---|---|---|
| 170,856 | 4/1952 | Austria | 55/349 |
| 112,237 | 6/1964 | Czechoslovakia | 55/346 |
| 1,189,075 | 3/1959 | France | 55/238 |
| 726,388 | 3/1955 | Great Britain | 55/349 |
| 37,851 | 4/1936 | Netherlands | 55/238 |

*Primary Examiner*—Dennis E. Talbert, Jr.
*Attorney*—David A. Maxon

[57] ABSTRACT

This invention relates to a strip cyclone configuration. Each strip comprises a plurality of chambers within an integral strip medium. Each of the chambers comprises a substantially cylindrical portion. Each of the cylindrical portions in each chamber is parallel with the cylindrical portion of each of the other chambers. Each chamber has a snail-like helical portion for inlet of gas having liquid suspended therein. The inlet portion of each chamber and the cylindrical portion of each chamber is separated by a wall of a portion of the integral medium from each of the other inlet portions and each of the other cylindrical portions, respectively, of each of the other chambers.

6 Claims, 6 Drawing Figures

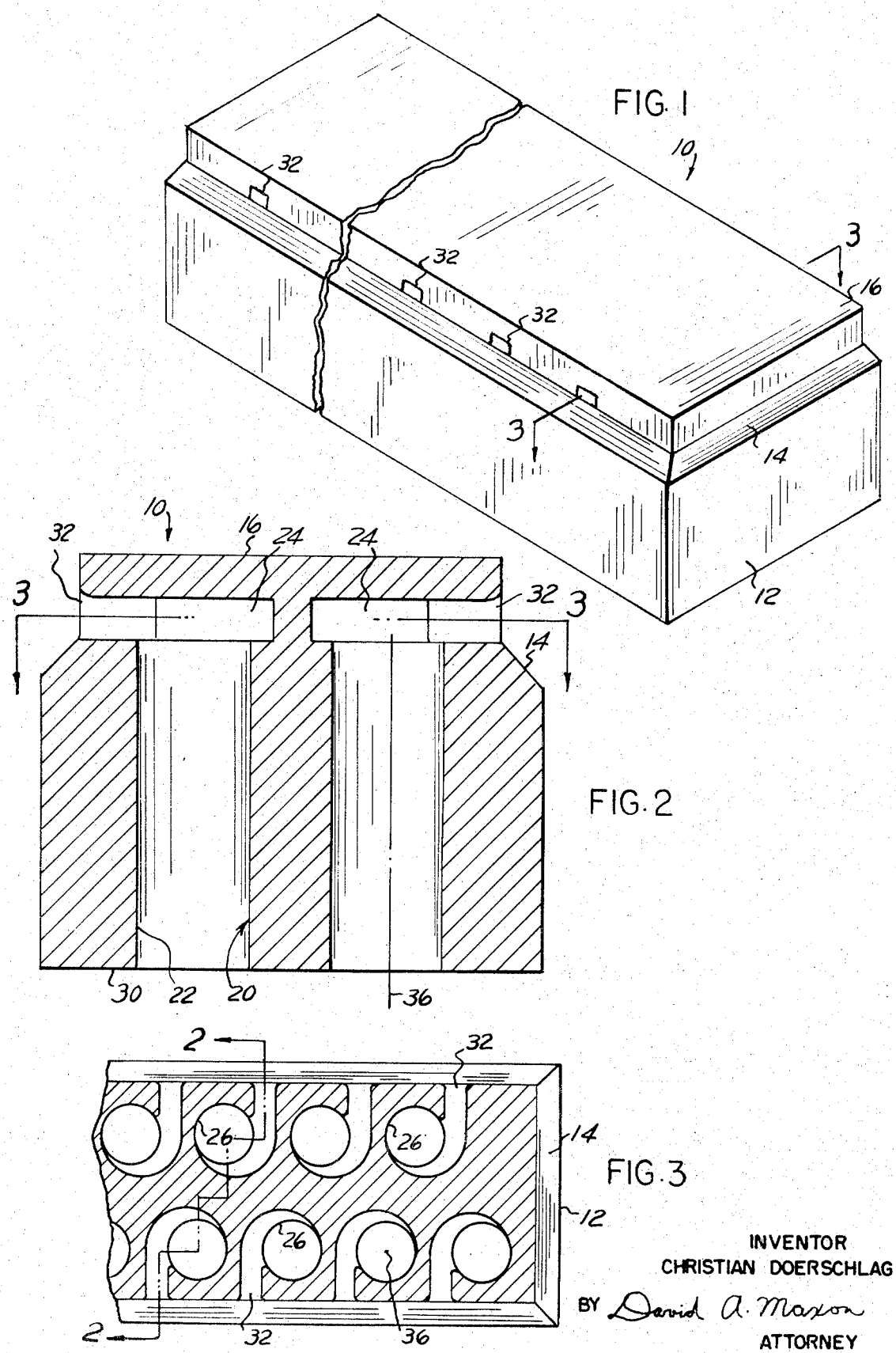

Patented May 8, 1973 3,731,463

INVENTOR
CHRISTIAN DOERSCHLAG
BY David A. Maxton
ATTORNEY

STRIP CYCLONE

This invention relates to an array of a plurality of cyclones wherein a sub-array of the cyclones are formed in an integral medium.

In the past, cyclone apparatus has been designed embodying an array of cyclones. An example of such design is disclosed in U.S. Pat. No. 2,874,799 issued on Feb. 24, 1959 to Van Der Kolk and assigned to Bureau Van Tongeren N. V. of Heemstedt, Netherlands, a Dutch company.

The Van Der Kolk patent discloses a cyclone having a snail-like or helical inlet portion flaring into the inner radial extremity of a cylindrical portion of a chamber. Gases containing liquid particles suspended therein are introduced in gas flow into the snail-like inlet portion. Due to the motion of the particles of the gas upon such entry, and the configuration of the snail-like entry portion of the cyclone chamber, the gas and particles suspended therein are swirled about such that the liquid is directed to the walls of the cylindrical chamber in ever increasing size of droplets upon further rotation. The gas and liquid are extracted or flow out of the chamber through a common outlet port.

The principle involved in the operation of such a device is not to rely upon the scrubbing effect of water sprays or upon turbulence created by high velocity gas flow, but in contra-distinction to this, to rely upon the conversion of the pressure energy of gases into centrifugal forces. The effect produced by these forces is a high collecting efficiency when extracting dust, mist and fumes having particles of relatively small size from waste-gases and process-gases. The energy consumption is considerably lower than that required by other types of scrubbers of comparable efficiency.

The above referred to Van Der Kolk patent discloses an array of tiles wherein each tile has an inlet chamber and cylindrical outlet chamber portion as discussed above. An array disclosed in the Van Der Kolk patent is that of a vertical array. More precisely, this is an array in which the cylindrical outlet portion of each chamber is co-communicative with and integral with the cylindrical outlet portion of each of the other chambers in the array. The cylindrical portions are co-axial and vertically stacked one upon the other.

Another type of array of cyclone chambers is a horizontal array. In a horizontal array, the array comprises a plurality of tiles. Each tile has a snail-like inlet portion and a cylindrical outlet portion as discussed above. Each tile is manufactured separately and then assembled in the array.

The present invention relates to an integral strip array of cyclone chambers wherein each of the chambers has a snail-like inlet portion and a cylindrical outlet portion similar to that described above. However, this configuration is achieved by the present invention in a manner different from that discussed above as will be discussed more fully below.

It is an object of this invention to provide a cyclone apparatus comprising a plurality of sub-arrays of cyclone chambers wherein each sub-array is an integral structure.

It is another object of this invention to provide an integral sub-array of cyclone chambers in a manner that reduces the number of assembled components in an operative cyclone device; reduces the cost of production machinery necessary to produce cyclone apparatus; reduces labor in the forming of snail-like inlet portions and cylindrical outlet portion of cyclones; reduces complications in the fabrication of cyclone chambers; reduces maintenance and eliminates complication of maintenance in cyclone devices; and reduces costs in maximizing flexibility of design parameters for cyclone devices embodying the invention.

It is a further object of this invention to provide a modular unit designed with the appropriate expertise in the art of particle or mist collection for use in a proper enclosure around it, where the design of the aforesaid proper enclosure does not require expertise in particle or mist collection. In other words, it is an object of this invention to provide a modular unit having inlet ports of less than 6 square inches applicable to wide variety of design parameters of the enclosure where such parameters may be independent of design criteria of dust or mist collection, and yet the resultant assembly achieves a cyclone strip requiring significantly less space, less power consumption, less water consumption, and yet comparable efficiency of prior art devices such as a Venturi scrubber.

In a Venturi scrubber, the efficiency of the Venturi, that is, the efficiency of collection of dust particles by weight in a specific volume of gas at a temperature specified is dependent upon pressure drop. In a Venturi scrubber, the pressure drop across the Venturi throat is the primary parameter upon which the efficiency of the scrubber is determined. Impaction and agglomeration are the primary functions of the Venturi in removing dust particles from a gas stream.

These points are discussed in *Optimization of Factors Affecting Scrubber Performance* by M. Taheri and G. F. Haines published in Vol. 19, No. 6 of the Journal of the Air Pollution Control Association in the June 1969 issue: and *SUCCESSFUL CLEANING OF OPEN-HEARTH EXHAUST GAS WITH A HIGH-ENERGY VENTURI SCRUBBER* by C. A. Bishop et al., of Applied Research, U. S. Steel Corporation No. 60-51; and U.S. Pat. No. 2,604,185, issued July 22, 1952 to H. F. Johnstone et al.

In contrast, the present invention is dependent upon centrifugal force in removing liquid particles, in which solid particles such as dust are suspended, from a gas stream. In a cyclone that is an embodiment of the present invention, a force having an order of magnitude 50,000 times greater than the force of gravity is achieved. By virtue of the fact that the principle of separation in the cyclone embodiment of the present invention is dependent primarily upon centrifugal force in contrast to the principle factors of an impaction and agglomeration utilized in the Venturi, cyclones having a throat area of relatively small dimensions achieve an efficiency equal to or better than that of the Venturi scrubber. More particularly, in throat or port entry having a cross-sectional area of less than 6 inches, this effect is achieved.

A still further object of this invention is to provide an integral strip of cyclones of miniature dimensions, that is dimensions of less than 2 inches in diameter in a manner that is inexpensive to fabricate and efficient in operation.

These and other objects of this invention will be understood more fully from the specification and claims below.

In this invention, a strip member is provided. The member is cast with shapes therein. These shapes correspond to cylindrical outlet portions and snail-like inlet portions of a cyclone device. In cyclone apparatus embodying this invention, these strips are arranged in parrallel-horizontal arrays and a sealant is provided between the strips.

ON THE DRAWINGS

FIG. 1 is a perspective three-dimensional view of a strip member of the preferred embodiment of the invention;

FIG. 2 is an enlarged cross-sectional view of the apparatus taken along section lines 2—2 of FIG. 3;

FIG. 3 is a partial transverse sectional view of the apparatus taken along section line 3—3 of FIG. 1;

Figure 4:
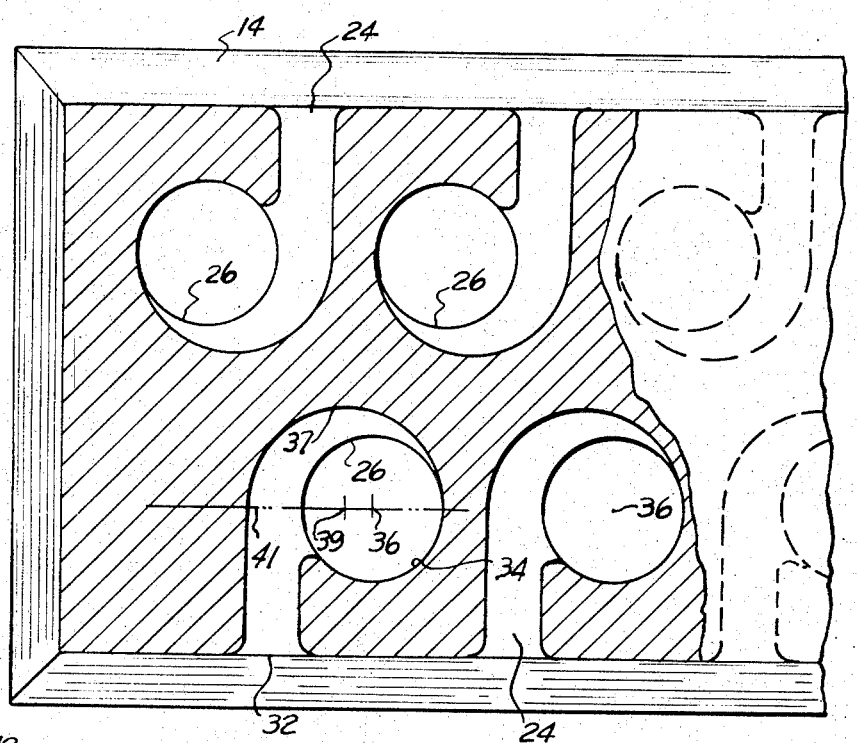
FIG. 4 is an enlarged view of the apparatus shown in FIG. 3.

Before explaining the present invention in detail, it is to be understood that the present invention is not limited in its application to the details of construction and arrangement of parts illustrated in the accompanying drawings since the invention is capable of other embodiments and of being practiced or carried out in various ways.

Also, it is to be understood that the phraseology and terminology employed herein is for the purpose of description and not of limitation.

AS SHOWN ON THE DRAWINGS

A strip member 10 of the preferred embodiment of this invention is shown in FIG. 1. The strip member 10 is in the shape of a long rectangular parallelepiped body portion 12 having upper mid section beveled edges 14 surrounding the upper mid section perimeter thereof and a top rectangularly shaped cap portion 16. The strip member is preferably cast from a liquid material in a process using special molding equipment, and after the material has hardened by cooling, forms and molds are removed leaving the completed shape. The material can be iron, bronze, aluminum, zinc, nylon, glass, Bakelite, or ceramic or other material suitable for forming and use in such application.

Interior shapes are formed during the casting process of the strip member 10. These interior shapes are cyclone chambers 20. The cyclone chambers comprise outlet chamber portions 22 and inlet chamber portions 24. The outlet chamber portions 22 are apertures in the strip member 10 that have right circular cylindrical walls 26. The outlet chamber portions extend from a high point, level with the top inner angle 28 of the beveled edges 14, to the bottom 30 of the strip member.

The inlet portions 24 have a snail-like appearance which spirals from entry ports 32 beginning immediately above the top inner angles of beveled edges 14 and converging into a circular surface 34. The circular surface 34 is radially concentric with the axis 36 of the right circular cylindrical outlet chamber portion 22.

Immediately prior to the convergence of the vertical wall surface of the inlet portion with the aforementioned right circular cylindrical wall portions of the outlet chamber portion, the vertical wall portion of the inlet chamber portion extends gradually radially outwardly from such convergence. This extension 37 is due to the shape of this vertical wall of the inlet portion that can be geometrically described as a semi-circular arc having a fixed radius proportionately significantly greater than the radius of the right circular cylindrical wall of the outlet chamber portion and having an axis 39 of rotation parallel to the axis 36 of rotation of the right circular cylindrical wall aforementioned. A plane 41 passing through these axes of rotation is parallel to the exterior vertical length of the strip member 10.

Figure 5:
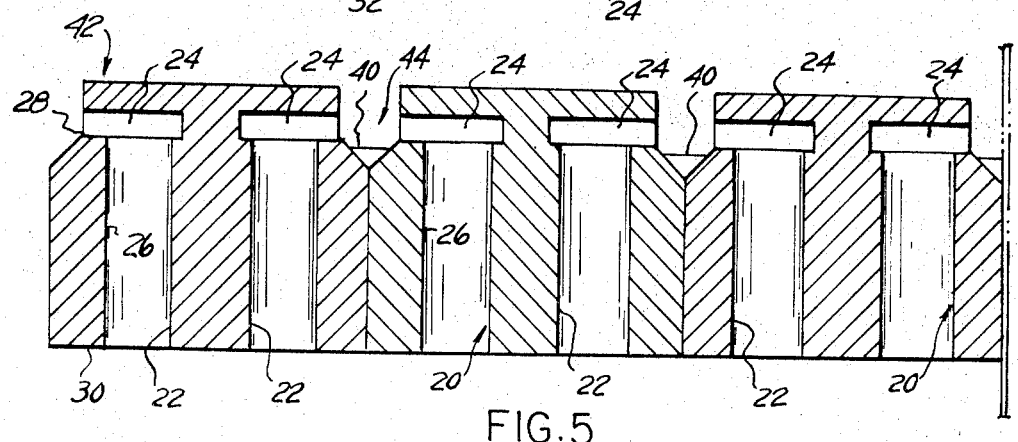
FIG. 5 is a cross-sectional view of a portion of an assembly of strip members of the preferred embodiment of this invention.

A cross section of the strip members in vertical array is shown in FIG. 5. The strip members are placed in parallel horizontal array with respect to each other. A sealant 40 is provided between the adjoining strip members 10. The sealant 40 is preferably a material that is plyable and heat resistant and will provide an airtight joint under the operating conditions such as silicon, rubber, or tar. After the sealant is applied, the horizontal array 42 is provided with channel portions 44 that serve as conduits of large conglomerates of liquid separating from gas in a liquid saturated or near saturated condition, sprayed from a nozzle, (not shown) located above the array of strips and evenly distributed across the array of strips prior to the entry of the gas into the inlet ports 32.

Figure 6:
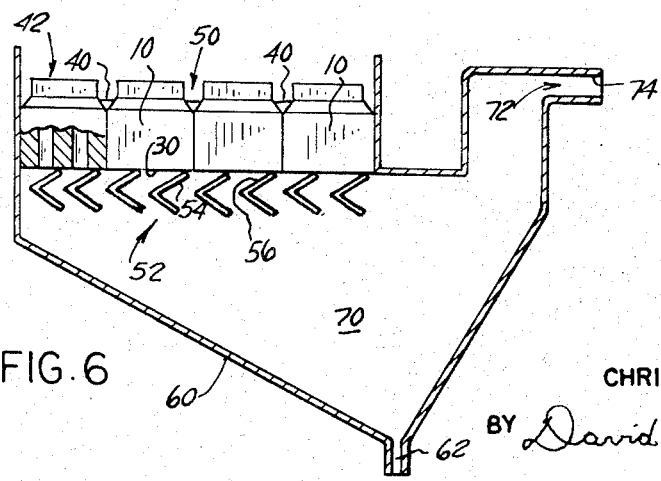
FIG. 6 is a fuller cross-sectional view of the apparatus of the preferred embodiment of this invention.

In FIG. 6 a gas flow in the direction of arrow 50 is directed towards an array of strip members 10. The gas enters the cyclone chambers 20 and the gas then passes downwardly through cyclone chambers 20 together with the liquid that has collected along the walls of the outlet chamber portions 22. An array of metal L-shaped members or angle irons 52 are secured below, and support the array of strip members 52. The length of each angle iron 52 is substantially perpendicular to the length of each strip member 10. The top portion 54 of each of the angle irons is located below the bottom 30 of the strip members near the bottom of the outlet chamber portions 22. Liquid that is collected along the walls of the outlet chamber portion 22 is free to flow onto the top surface 56 of the top portion 54 of the angle irons. The angle irons direct this liquid to flow into a pan 60, which in turn directs the flow of liquid to a drain 62. The gas coming from the outlet chamber portions 22 flows between the angle irons 52 and is directed out of chamber 70 in the direction of arrow 72 through outlet portion 74.

From the preceding specification, it can be observed that apparatus for separation of small liquid particles suspended in the gas has been provided that is uncomplicated in manufacture and operation. In particular, it can be observed that the shape of the cyclone, which requires a significant measure of precision, can be molded in sub-arrays, where each sub-array comprises a significantly large plurality of such cyclone shapes. The resulting sub-array is a single part that can be readily molded. The utility of an integral sub-array of cyclones in constructing and maintaining a cyclone in separation of liquid in small particles from gas, in an efficient and uncomplicated manner, can thus be readily appreciated.

I claim:

1. In a cyclone apparatus for agglomerating minute particles of liquid suspended in a gas to form large drops, the improvements comprising:

a sub-array consisting of a plurality of parallel separating chambers having separate interior wall surfaces;

each of said chambers having the same cross-sectional shapes as each of the other chambers;

each of said chambers being provided with only one tangential inlet portion separated at a distance from the tangential inlet portion of each of the other chambers;

each of said chambers being provided with only one outlet portion axially spaced away from and having surfaces tangential with its aforementioned inlet portion and separated from and non-communicative with each of the outlet portions of each of the other chambers;

each of said chambers arranged to impart rotary movement to a flow of gas and suspended liquid introduced thereto;

each of said chambers conducting said flow of gas and condensed liquid out of said outlet portion;

and each said sub-array of chambers being contained within a single integral cast medium and structure and an array of said sub-array of said sub-arrays of chambers comprising parallel contiguous arrays of the aforementioned sub-arrays; a sealant provided in channels defined by the side by side relationship of said sub-arrays; said channel being operable to conduct liquid in large agglomerates separating from saturated or nearly saturated gas prior to the entry of the gas into the inlet portion of said chambers.

2. The apparatus of claim 1 and fluid conduit members supporting said sub-arrays being in a parallel array themselves and being substantially perpendicular to the longitudinal displacement of each of the integral chambers; and directing liquid collected within the outlet portions of the chambers downwardly from said array of chambers.

3. The apparatus of claim 2 and a pan for a drain for respectively directing the flow and collecting the flow of liquid from the supporting structures.

4. The apparatus of claim 3 and a gas outlet port operable to conduct gas from between supporting structures outwardly and through a port spaced at a distance away from the drain and in a direction from the space between the supporting structures different from the direction between said space and said drain.

5. The apparatus of claim 1 wherein each inlet portion of each of said chambers has a snail-like helical portion;

each outlet portion of each of said chambers has a right circular cylindrical portion;

said inlet portion having interior wall surfaces that are right circular cylindrical in shape having a radius greater than the radius of the cylindrical portions of said outlet portions and converging with the cylindrical wall of said outlet portion;

the diameter of said outlet portion being less than 2 inches;

said apparatus having an efficiency of the same order of magnitude of a Venturi scrubber at lower power.

6. In the apparatus of claim 5, the inlet portion having a cross-sectional area of less than 6 square inches and relying primarily solely on centrifugal forces generated within the inlet chambers to separate liquid particles suspended in the gas from the gas while in the chamber, wherein the pressure drop within the inlet portion of the chamber is less than a pressure drop of a Venturi scrubber having similar dimensions and comparable efficiency.

* * * * *